United States Patent
Farina et al.

(10) Patent No.: US 8,184,991 B2
(45) Date of Patent: May 22, 2012

(54) DITHERLESS OPTICAL MODULATOR CONTROL

(76) Inventors: Joseph P. Farina, Southwick, MA (US); Gregory J. McBrien, Glastonbury, CT (US)

( * ) Notice: Subject to any disclaimer, the term of this patent is extended or adjusted under 35 U.S.C. 154(b) by 520 days.

(21) Appl. No.: 12/402,693

(22) Filed: Mar. 12, 2009

(65) Prior Publication Data

US 2009/0232517 A1    Sep. 17, 2009

Related U.S. Application Data

(60) Provisional application No. 61/035,913, filed on Mar. 12, 2008.

(51) Int. Cl.
*H04B 10/04* (2006.01)
(52) U.S. Cl. .......... 398/198; 398/182; 398/192
(58) Field of Classification Search .......... 398/198
See application file for complete search history.

(56) References Cited

U.S. PATENT DOCUMENTS

| | | | |
|---|---|---|---|
| 5,170,274 A | 12/1992 | Kuwata et al. | 398/198 |
| 5,742,907 A * | 4/1998 | Brown | 455/503 |
| 6,879,422 B2 | 4/2005 | Notargiacomo et al. | 359/245 |
| 7,092,643 B2 | 8/2006 | Kajiya et al. | 398/198 |
| 7,200,343 B2 | 4/2007 | Ikeuchi | 398/198 |
| 7,333,736 B2 | 2/2008 | Sardesai et al. | 398/201 |
| 2003/0058495 A1* | 3/2003 | Brindel | 359/123 |
| 2007/0092266 A1 | 4/2007 | Shimizu et al. | 398/198 |
| 2009/0142073 A1* | 6/2009 | Smith et al. | 398/192 |

* cited by examiner

*Primary Examiner* — Dawayne A Pinkney
(74) *Attorney, Agent, or Firm* — Matthew A. Pequignot; Pequignot + Myers LLC

(57) ABSTRACT

A method of controlling the operating parameters of an optical modulator, without using a dither signal, is provided. Past operating parameters are compared to present operating parameters using a quality of modulation signal obtained by cross-correlating the data modulation signal used to drive the optical modulator with the modulated optical signal output from the optical modulator. The quality of modulation signal is used to optimize the operating parameters (e.g., bias point) of the optical modulator, or other operating parameters of the arrangement, such as the modulator drive level, timing alignment, etc.

23 Claims, 18 Drawing Sheets

DITHERLESS OPTICAL MODULATOR CONTROL

CROSS-REFERENCE TO RELATED APPLICATIONS

This application claims the benefit of U.S. Provisional Application No. 61/035,913, filed Mar. 12, 2008, the contents of which are incorporated by reference herein.

TECHNICAL FIELD

The present application relates generally to optical modulators and the control thereof, and in particular, to the ditherless control of optical modulators.

BACKGROUND

In high-speed optical communication systems, optical modulators are typically used to modulate light emitted from a continuous wave (CW) laser in order to transmit voice, data, and/or video signals. Digital transmission is a special case of general signal transmission using optical modulators, most notably in that the modulation waveform is a large signal modulation, using the full intensity available from the modulator, from on to off.

Optical modulators that use a Mach-Zehnder (MZ) interferometer formed in an electro-optic substrate such as lithium niobate ($LiNbO_3$), have been used widely in the digital transmission of optical high speed data signals, primarily due to the superior chirping characteristics, wide bandwidth, and low insertion losses thereof.

In a $LiNbO_3$ MZ optical modulator, an RF information-bearing signal is applied to one or more of the parallel waveguides making up the interferometer arms in order to impress the information onto the light propagating therethrough. In order to achieve maximum modulation efficiency during this electrical to optical conversion, the bias (or operating) point of the MZ optical modulator is typically set at quadrature (e.g., the DC bias voltage is set to the point of inflection of the sinusoidal transfer function). Unfortunately, due to the nature of the electro-optic substrate and the interferometic principles upon which the MZ optical modulator is based, the bias point of these devices tends to drift with changes in wavelength and/or temperature, and/or as a result of aging. As a result, $LiNbO_3$ MZ optical modulators typically require some type of bias control. Active bias control is particularly important for external optical modulators used in systems transmitting digital data at 10 Gb/s or higher, wherein bias drift can preclude good data fidelity.

Actively controlling the bias point of optical modulators, and in particular $LiNbO_3$ MZ optical modulators, with a control loop is well known. For example, analog, digital and DSP schemes have all been used. In general, these schemes typically use some type of dither applied to the modulator, either a tone or signal summed into the signal path, or a tone or dither signal applied to the gain control of an amplifier, to produce an amplitude modulated (AM) stimulus. While dither signals typically interfere only minimally with the normal operation of optical modulators, they can unfortunately cause interference in the modulator output.

One control scheme that does not rely on a dither signal has been proposed, wherein a simple subtractive comparison of the average power of the modulator and a set-point is used. While this average power scheme works with no dither, it is, unfortunately, susceptible to errors when the average power is affected by other undesired effects.

SUMMARY OF THE INVENTION

The present invention relates to an optical modulator and a method of controlling the operating parameters of the optical modulator, wherein the input signal to the modulator is cross-correlated (e.g., multiplied) with the output signal to create a quality of modulation signal. The quality of modulation signal is used to optimize the operating parameters of the optical modulator. For example, in one embodiment the quality of modulation signal is used to provide ditherless bias control of the optical modulator.

In accordance with one aspect of the instant invention there is provided a method of providing a modulated optical signal comprising: generating an electrical data modulation signal, the electrical data modulation signal for providing a drive signal and a reference signal; modulating an optical signal using the drive signal; converting a portion of the modulated optical signal into an electrical signal; cross-correlating the electrical signal with the reference signal to provide a quality of modulation signal; and adjusting system operating parameters in dependence upon the quality of modulation signal.

In accordance with one aspect of the instant invention there is provided a system for providing a modulated optical signal comprising: a modulation signal source for generating an electrical data modulation signal, the electrical data modulation signal for providing a drive signal and a reference signal; an optical modulator for producing a modulated optical signal using the drive signal; a photodetector for converting a portion of the modulated optical signal into an electrical signal; a cross-correlator having a first input for receiving the electrical signal, a second input for receiving the reference signal, and an output for providing a quality of modulation signal, the quality of modulation signal equal to the product of the electrical signal and the reference signal; and a signal adjuster for adjusting operating parameters of the optical modulator in dependence upon the quality of modulation signal.

In accordance with one aspect of the instant invention there is provided system for providing a modulated optical signal comprising: an optical modulator having an input optical port for receiving a light signal, an input electrical port for receiving a data modulation electrical signal for modulating the light signal, and an output port for transmitting a modulated light signal; a reference modulation signal source for generating the data modulation electrical signal and a reference data modulation signal; a tap for separating a portion of the modulated light signal; a monitoring photodiode detector for monitoring the portion of the modulated light signal exiting the optical modulator, and for generating a modulated electrical output tap signal; a signal processor for receiving the reference data modulation signal and the modulated electrical output tap signal, for forming a cross-correlation of the reference data modulation signal and the modulated electrical output tap signal, and for creating a quality of modulation performance signal; and a signal adjuster for adjusting the data modulation electrical signal based on the quality of modulation performance signal in order to improve the modulated optical output signal.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
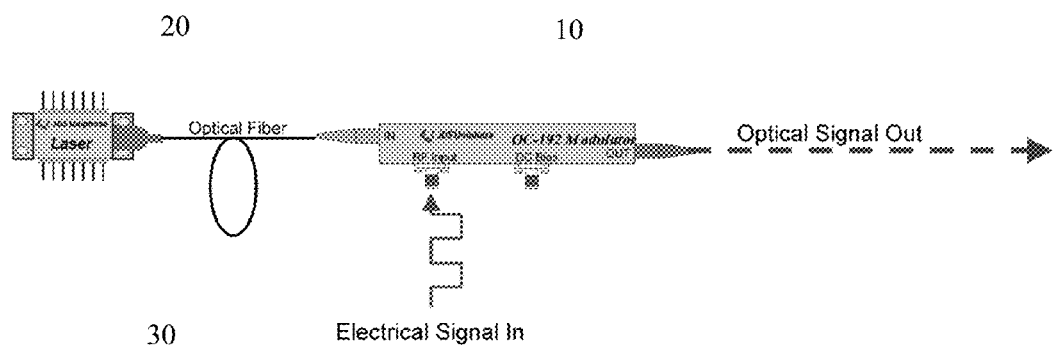
FIG. 1 is a block diagram of a prior art optical transmitter utilizing an external NRZ optical modulator.
Figure 2:
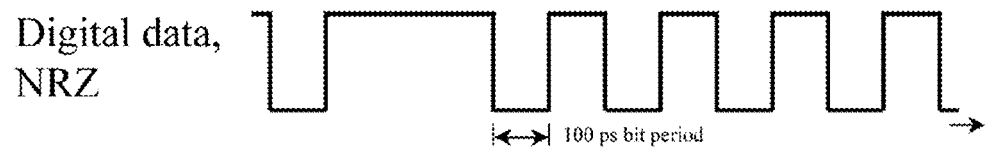
FIG. 2 illustrates the NRZ data format.

Referring to FIG. 1, there is shown an external optical modulator 10 for impressing data onto light emitted from a CW laser 20 and transmitted through an optical fiber 30. The optical signal output from this digital optical modulator 10 is regarded as having non-return-to-zero (NRZ) format, because the waveform representing the digital data stays up or down, with no transitions, unless the data value changes from 0 to 1. As illustrated in FIG. 2, which shows the encoded stream for 10 Gb/s data, one characteristic of NRZ data is that the average value of the signal, for an equal density of 1's and 0's is 50% of the waveform height. An average value of 50% can be important for systems that are not DC coupled, as the waveform can be AC coupled, and the top and bottom of the signal should not generally be allowed to drift up and down with changes in the data pattern.

Figure 3:
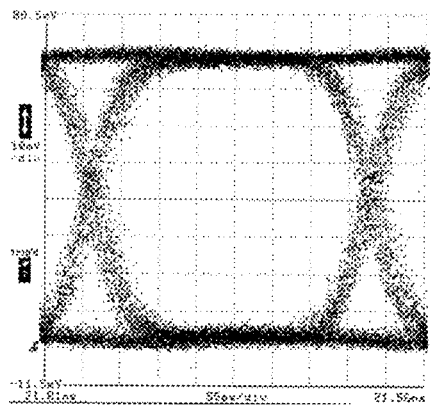
FIG. 3 illustrates the NRZ data as an "eye" diagram.

One way of pictorially showing NRZ data is with an "eye" diagram, which has the series stream 1's and 0's folded into a one-bit-time diagram. More specifically, the eye-diagram is a superimposed plot of amplitude versus time, for all the optical signals produced by the optical modulator. Referring to FIG. 3, which shows one example of an eye diagram, the center of the X's determine the eye crossing level, which is shown having the ideal value of 50%.

Figure 4:
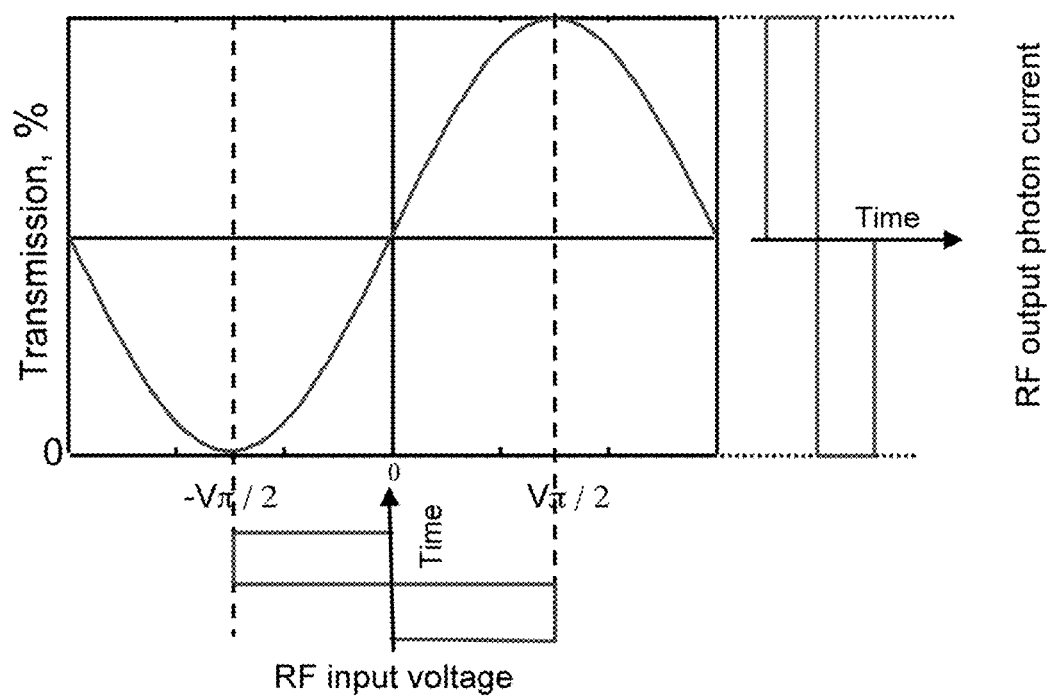
FIG. 4 shows the sinusoidal transfer function of an external modulator with data input and data intensity output.

This balance of 1's and 0's also facilitates NRZ bias control in $LiNbO_3$ MZ optical modulators. Referring to the modulator transfer function illustrated in FIG. 4, which is a theoretically sinusoidal curve that represents the points at which the optical modulator will transition from no output to maximum output, it is clear that the bias point, or time averaged value of the intensity, should be at the half power point (i.e., at quadrature), if we want to represent a logic one signal by the maximum of the modulator output, and a logic zero by the off state, or zero intensity point of the modulator.

As discussed above, high speed $LiNbO_3$ MZ optical modulators generally require some type of bias control since changes in wavelength, temperature and aging produce drift in the bias point. While the bias point of GaAs and other short physical length optical modulators, or even 2.5 Gb/s $LiNbO_3$ MZ optical modulators, can be set at the beginning of life, or even better at the beginning of operation, it is still more common to provide some means to actively control the bias point. Since changes in temperature are known to significantly affect the bias point of these optical modulators, one of the simplest approaches is to program a temperature compensation to remove the errors in the bias point that result from temperature effects. Another, slightly better, approach is to run a control loop that monitors the average power output, and adjusts the bias constantly to maintain the right set point. Another approach, which is relatively difficult to implement, works on the high speed characteristics of the data, so that the data is measured and monitored in real time to set up the proper data "shape". By far the most common approach, especially for $LiNbO_3$ MZ optical modulators operating at speeds of 10 Gb/s and higher, is to inject a dither signal that interferes minimally with normal operation, which is always present, in order to provide feedback for setting the bias point.

Figure 5:
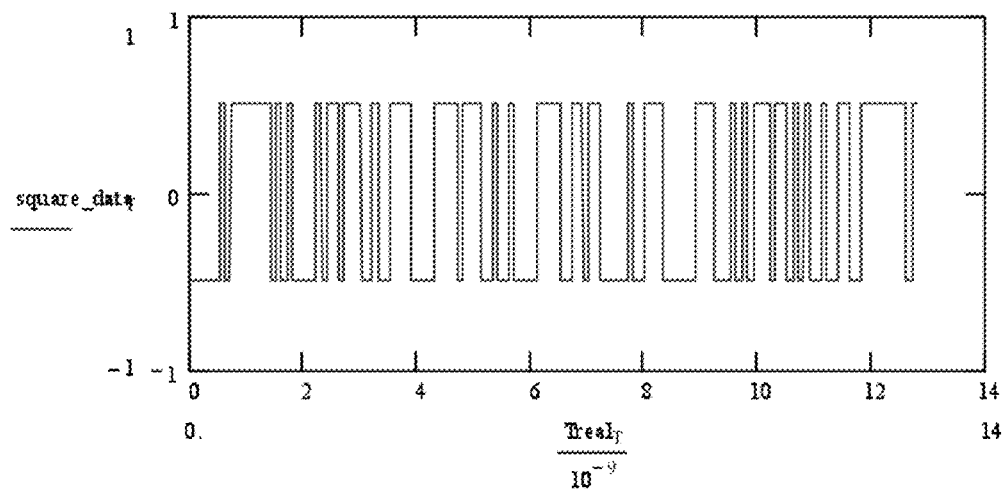
FIG. 5 illustrates a normal NRZ data pattern.
Figure 6:
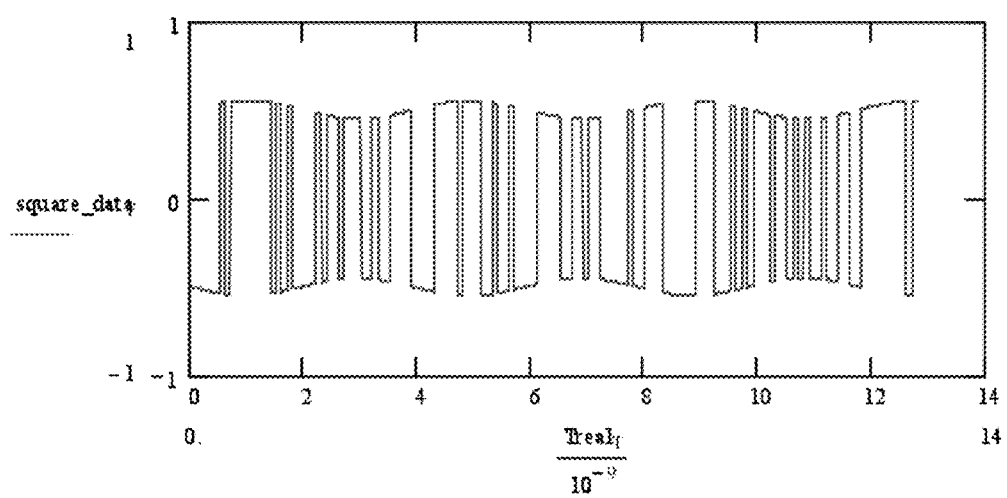
FIG. 6 illustrates a NRZ data pattern with AM dither.

If a small dither signal is injected into the RF driver gain control, the dither will show up as AM sidebands on the digital data. These sidebands are evident when comparing FIGS. 5 and 6, which show the waveform of a normal NRZ data pattern, and the waveform of digital NRZ data pattern with AM dither, respectively. The low-frequency AM dither is typically about 1% in size, compared to the full intensity, and is typically small enough not to interfere with the data. Note that the dither signal, which is exaggerated in order to clearly demonstrate the waveform in FIG. 6, is imposed on the information signal in such a way that the two sides of the signal envelope are of equal amplitudes and opposite phase. When the digital NRZ data pattern with AM is applied to the optical modulator, the data waveform will be impressed on the output signal. The output signal is then monitored/analyzed, with reference to the dither signal, in order to provide feedback for controlling the bias of the optical modulator.

In general, these dither bias control schemes take advantage of the well-known sinusoidal shape of the transfer function. If the optical modulator is biased at quadrature, the monitored optical intensity signal will not contain a component at the dither frequency (e.g., since the dither signal was imposed on the information signal in such a way that the two sides of the signal envelope were of equal amplitude and opposite phase, and since the average power of the optical signal is constant). More specifically, for signals that vary about the top and bottom of the sinewave, the signal envelope at the top will be frequency doubled, because of the $X^2$ algebraic operation that the sinewave produces. When the signal is passed through a low-pass filter to remove the high speed data, the recovered sinewave will be at the second harmonic of the dither, and not the fundamental frequency of the dither itself.

Figure 8:
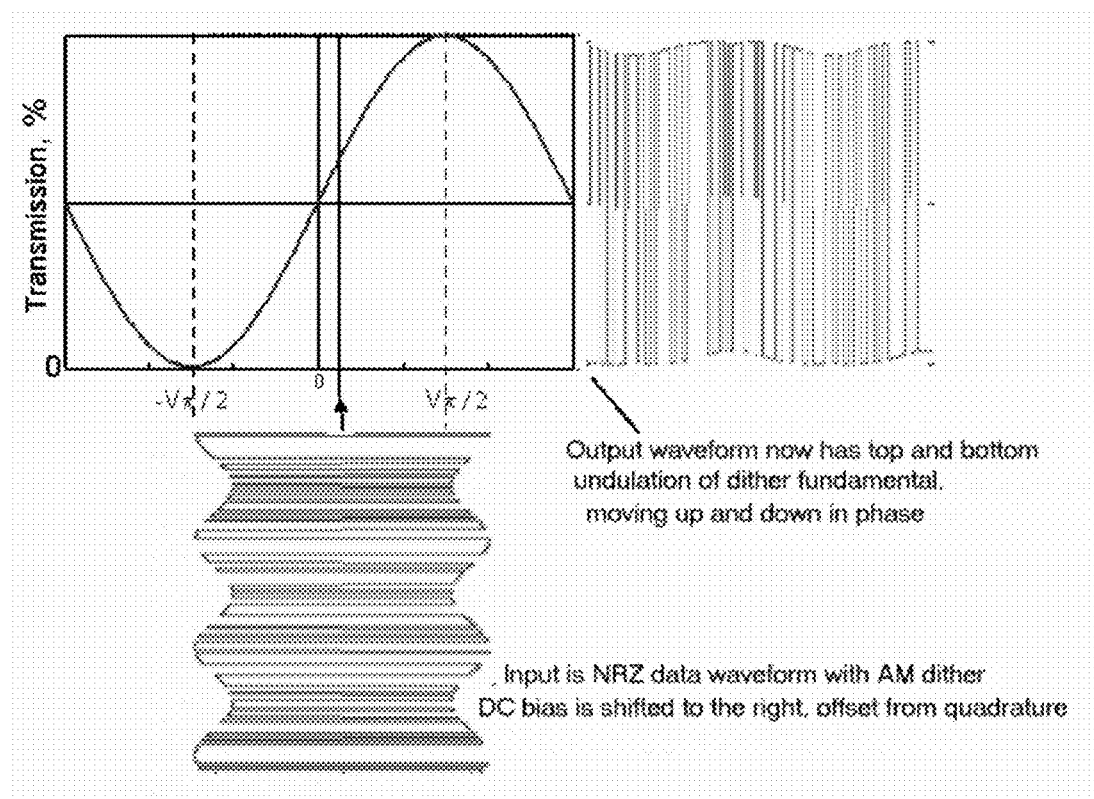
FIG. 8 shows the sinusoidal transfer function of a modulator suffering bias drift where the data input has AM dither and the intensity output produces an error signal at the dither frequency.

If on the other hand the optical modulator is not set at quadrature (e.g., the bias point is too high as illustrated in FIG. 8), then the modulation of the upper side of the information signal envelope will be far enough from the bias point to be reduced or even inverted in polarity. When the signal is passed through a low-pass filter to remove the high speed data, the recovered sinewave will include a dither component (e.g., some linear or X term proportional to the dither is seen). More specifically, the recovered sinewave will be at the same frequency as the AM dither signal.

Accordingly, the recovered sinewave provides an output error signal that will be zero when the modulator is biased at quadrature, and will be at the dither frequency when the modulator is biased above or below quadrature. For a digital RF signal of radian amplitude $\beta=\pi V/V_\pi$, amplitude modulated by a small percentage ($A_m$ %), with a phase offset ($\alpha$) from quadrature, the error signal is approximated as:

$$\text{Error}(\alpha,\beta,Am)=P_0\{\cos[(1+A_m)\beta]-\cos[\beta]\}\sin(\alpha)/2$$

Figure 9:
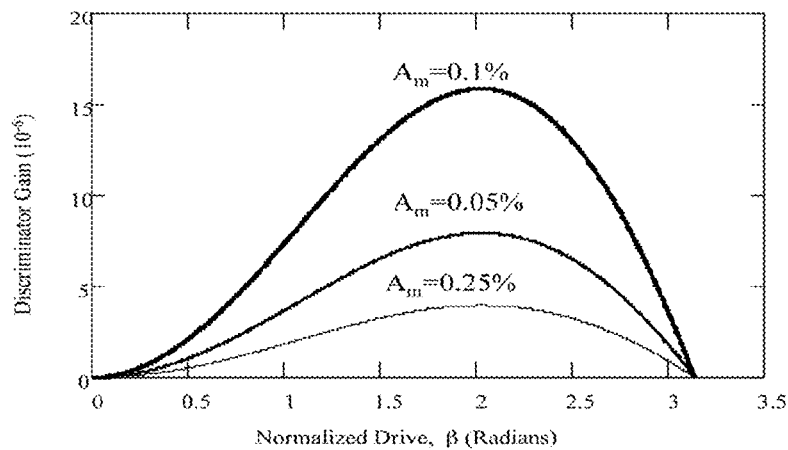
FIG. 9 is a plot of phase discriminator gain versus normalized RF drive.

As expected, this phase detection, or discrimination characteristic, is a sinusoidal function of the phase offset $\alpha$. This characteristic has an amplitude that depends on the optical power level, the modulation amplitude, and the relative RF drive level as shown in FIG. 9. Note that the phase detector increases for $\beta=2$ then decreases.

Figure 7:
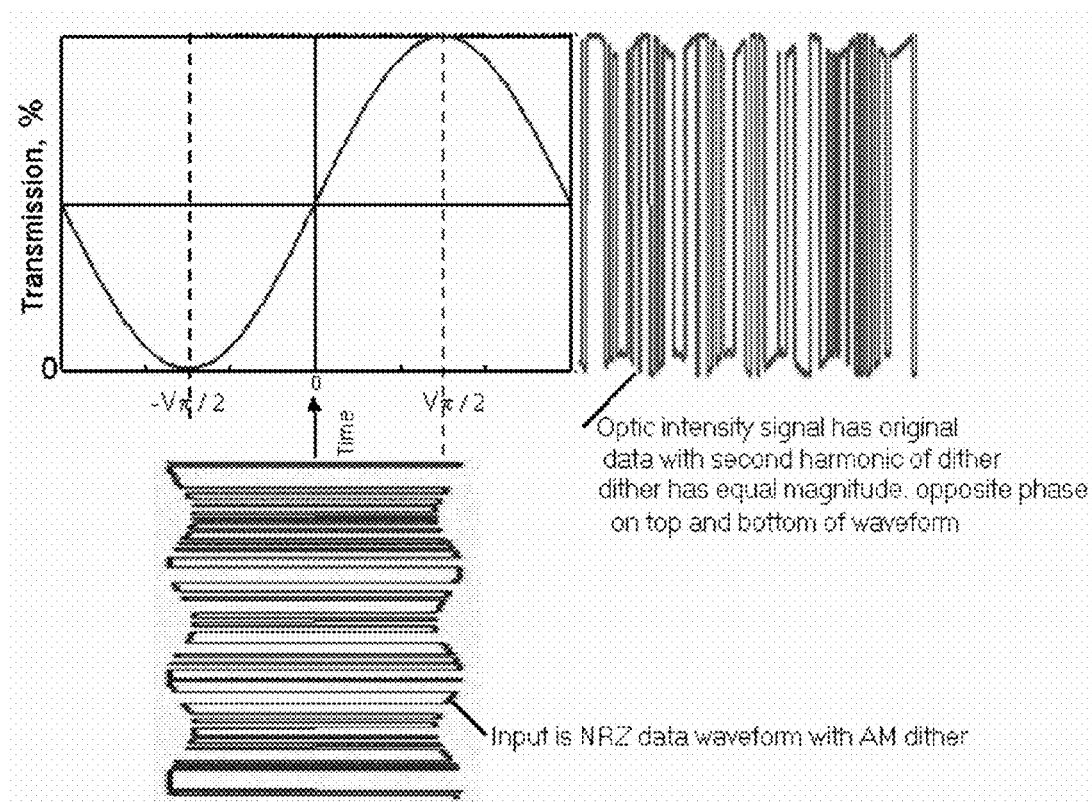
FIG. 7 shows the sinusoidal transfer function of a properly biased optical modulator where the data input has AM dither and the intensity output does not produce an error signal at the dither frequency.
Figure 10:
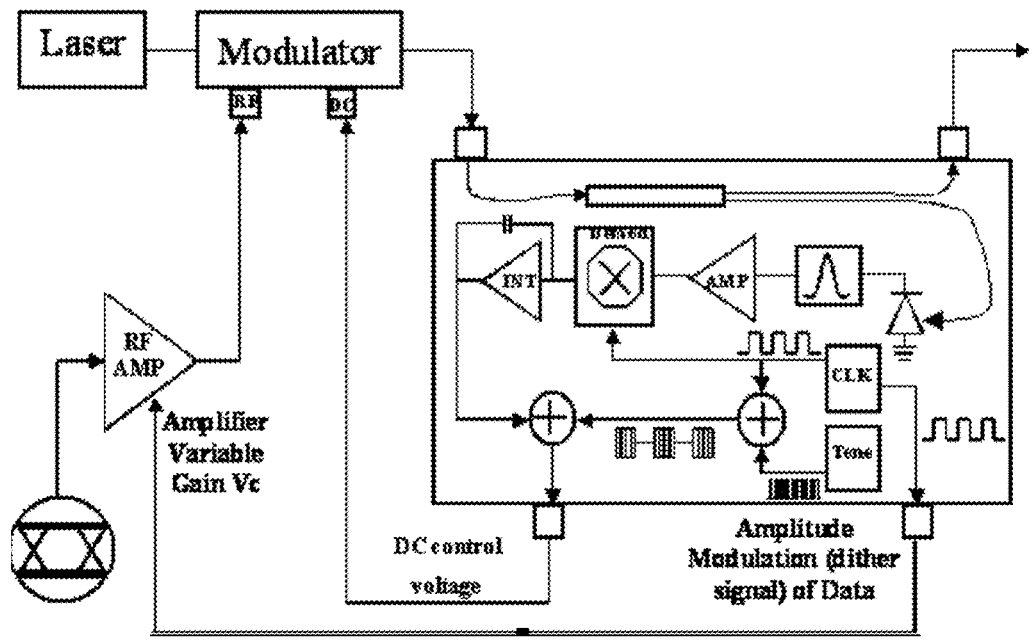
FIG. 10 is a block diagram of an optical transmitter, wherein a NRZ optical modulator is controlled with an AM dithered bias control loop.

Referring to FIG. 10, there is shown an analog control loop utilizing the above-described bias control using AM dither In this prior art control loop, the dither signal is generated and fed into the gain control pin of the driver/amplifier that is used to drive the digital data into the modulator. Since the implementation depends on the AM behavior of the dither, care must be taken such that the dither signal does not "sum" with the digital data, since AM modulation is essentially a multiplication of the input dither with the data signal. The dither, as mentioned previously, typically will have an amplitude of 1% of the optical output intensity. As described with reference to FIGS. 7 and 8, the output waveform from a modulator not at quadrature, produces an error signal which is low passed after an optical tap/detector. The signal is then demodulated (multiplied), with a phase sensitive detector, to produce a DC error signal that pushes the integrator in a direction to null the error signal. In general, enough gain should be provided in the system to lock the loop in approximately 1 second. Empirically, lock times on the order of 1 second have sufficient bandwidth to track environmental changes, and provide enough filtering and slow response to slice back the noise spectrum of the loop for stable control. Span of control, that is the supply rail range of the op-amps driving the modulator should be approximately +/−2 times the $V_\pi$ of the modulator, to account for temperature, wavelength, voltage induced drift, and aging. Control loops using AM dither are further described in U.S. Pat. No. 5,170,274.

Despite the widespread use of AM dither for controlling the bias of optical modulators, there are several disadvantages to using the dither signal. For example, although the dither signal typically interferes only minimally with normal operation, it is actually impressed on the optical signal and thus can introduce excess noise or otherwise perturb the optical output. In addition, since AM dither control is dependent on the output being dithered about a small signal quiescent point, this approach is not ideal. For example, referring again to FIG. 4, even though the average value of the signal is 50% at the half power point, the impressed data always sets the modulator output at either full on or full off, so the output never actually is set at the half power point. This is an important consideration for bias control of NRZ optical modulators, wherein the goal is to hold the modulator to quadrature, or half intensity point. This is why dithering, which uses a small signal at a small signal quiescent point, will not always work.

According to an embodiment of the instant invention, ditherless control of an optical modulator is achieved by sampling the input data signal (e.g., a portion of the RF information-bearing signal), and multiplying it by the output signal stream from the optical modulator. The resulting product is used in an active control loop to control the optical modulator. For example, in one embodiment the resulting product is used to control the operating point of the optical modulator.

Figure 11:
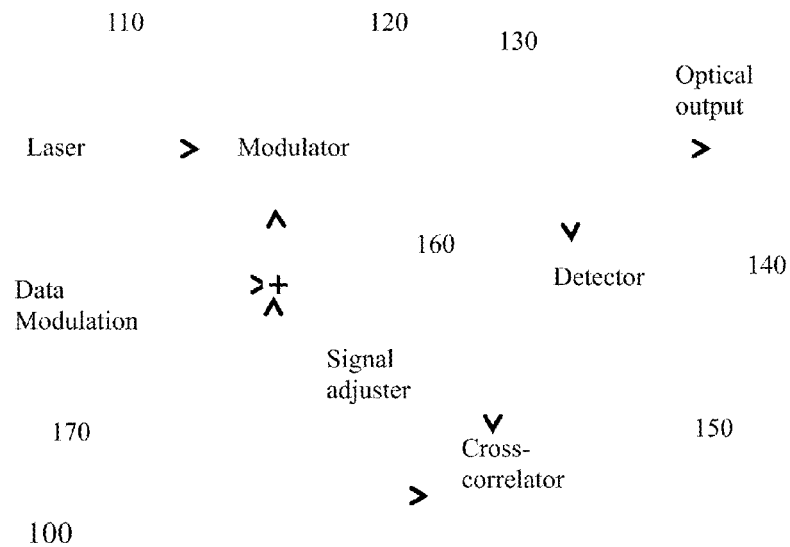
FIG. 11 is a block diagram of an optical transmitter, wherein an optical modulator is controlled without dither in accordance with an embodiment of the instant invention.

Referring to FIG. 11, there is shown a block diagram of an optical transmitter utilizing ditherless control of an optical modulator in accordance with an embodiment of the instant invention. The optical transmitter 100 includes a light source 110, an optical modulator 120, a tap 130, a photodetector 140, a cross-correlator 150, a signal adjuster 160, and a data modulation signal source 170. Optionally, a coarse delay adjustment or other means for matching signals input to the cross-correlator is provided (i.e., to improve the time alignment of the signals). Further optionally, one or more low-pass filters (not shown) are provided to filter the signals transmitted to and from the cross-correlator 150.

The light source 110, which in one embodiment is a semiconductor laser such as a distributed feed back laser, provides a continuous wave (CW) light signal. The optical modulator 120, which in one embodiment is a MZ optical modulator (e.g., single drive or dual drive) using an electro-optic substrate such as $LiNbO_3$, indium phosphide, gallium arsenide, or an electro-optic polymer, modulates the CW light signal. In other embodiments, the optical modulator 120 is an electro-absorption (EA) optical modulator. The tap 130, which in one embodiment is an optical coupler, allows at least a portion of the modulated light to be monitored. The photodetector 140, which in one embodiment is a photodiode, converts a tapped portion of the modulated light to an electrical signal. In other embodiments, the photodetector 140 is a photodiode for monitoring the off state light (i.e., substrate light) exiting the optical modulator and converting it to an electrical signal. The cross-correlator 150, which in one embodiment is an analog multiplier (e.g., mixer) cross-correlates the electrical signal provided by the photodetector 140 with a data modulation signal provided by the data modulation signal source 170 to provide a quality of modulation signal. In other embodiments, the cross-correlation is performed with a digital cross-correlator or in software. The quality of modulation signal, which provides an indication of the fidelity of the output optical signal, may provide insight into the eye opening, eye crossing, and/or chirp. The signal adjuster 160, which in one embodiment includes one or more analog components/circuits such as a hill climber, compares previous operating parameters to present operating parameters of the optical modulator, and optimizes/changes these operating parameters in dependence on the quality of modulation signal (e.g., bias input, RF drive). For example, in one embodiment the signal adjuster 160 includes a feedback generator and control loop output generator. In other embodiments, for example when the cross-correlation is performed in software, the signal adjuster includes a microprocessor. In general, the signal adjuster 160 will typically use the average value of the product (i.e., the quality of modulation signal) in the comparison. For example, the quality of modulation signal will typically have a maximum magnitude when the bias point of the modulator is optimum and/or when other parameters are optimized. In the embodiment illustrated in FIG. 11 the signal adjuster 160 adjusts the operating parameters via a single electrical input (e.g., the bias control is summed with the RF drive signal). In other embodiments, the bias voltage and RF drive are applied via separate electrical input ports. In either case, the quality of modulation signal can be used to adjust the bias point of the optical modulator 120, automatically maintaining bias at quadrature. The data modulation signal source 170, which in one embodiment includes a booster amplifier, provides the RF data modulation signal used to drive the modulator 120 (e.g., an information-bearing signal, which may include voice or video data). In embodiments where the data modulation signal source includes a booster amplifier, the RF data modulation signal may be sampled before or after being amplified.

The use of a coarse delay adjustment or other means for improving time alignment of the signals to be superimposed and cross-correlated improves the quality of modulation signal. The use of one or more low-pass filters (not shown) means that only the low frequency regions of the signal band needs to be monitored with the photodetector 140 and that the product provided by the cross-correlator 150 will be low frequency in nature. In fact, one advantage of this approach is that active control can be achieved with low frequency signals only, thus providing significant reductions in power and component cost.

Another advantage of this approach is that the optical modulation is controlled without corrupting the data modulation signal and/or the actual system signals. This is a distinct advantage over prior art control loops that perturb the data modulation signal and/or the optical signal transmitted through the optical modulator with a dither signal. In particular, the above-described approach is believed to be superior to prior art bias control loops using AM dither to control drift in LiNbO₃ optical modulators.

Figure 12:
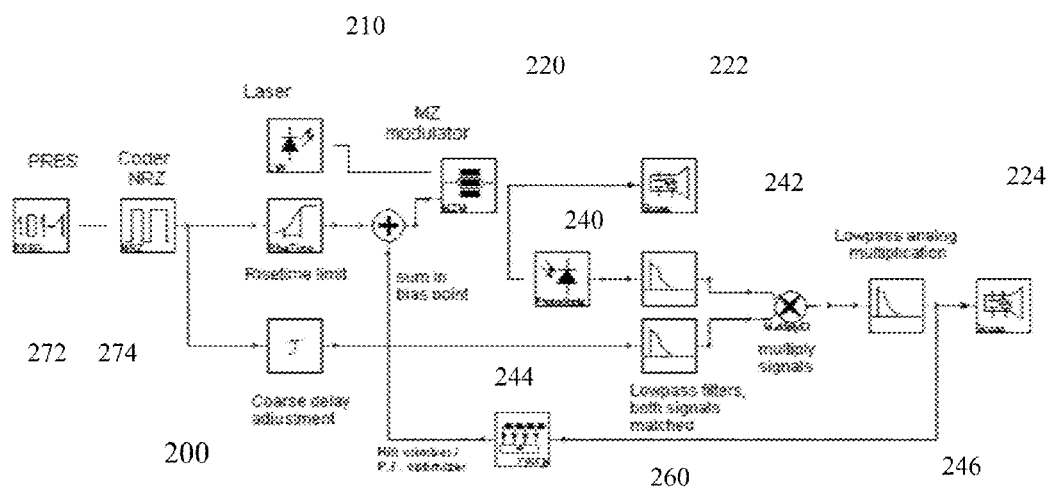
FIG. 12 is a block diagram of another optical transmitter, wherein a NRZ optical modulator is controlled without dither in accordance with an embodiment of the instant invention.

Referring to FIG. 12, there is shown a block diagram of an optical set-up used to demonstrate the ditherless bias control of an optical modulator, in accordance with an embodiment of the instant invention. The optical set-up 200 includes a semiconductor laser 210, a LiNbO₃ MZ optical modulator 220, first 222 and second 224 oscilloscopes, a photodiode 240, first 242, second 244, and third 246 low pass filters, a multiplier 250, a hill climber 260, a Pseudo-Random Binary Sequence (PRBS) generator 272, and a voltage driver 274.

In operation, the PRBS generator 272 provides a digital information signal that is applied to the voltage driver 274 to produce the NRZ data modulation signal used as the RF drive signal. The NRZ data signal has a resulting risetime limitation, which is a typical physical characteristic of electronic drivers and other bandlimited devices. The NRZ data signal is applied with suitable drive level to the optical modulator 220 such that the digital information signal (e.g., electrical signal) is impressed on the optical signal transmitted from the laser 210 and through the optical modulator 220, to provide a transduced information signal that is output from an output port of the optical modulator 220. Most of the optical signal output from the modulator 220 is passed to the oscilloscope monitor 222 (e.g., in a real system this would be the output port of the transmitter). A portion of the optical signal exiting the optical modulator 220 is tapped and passed to the photodiode 240. The photodiode 240 converts the tapped optical signal to an electronic tap signal, and passes this electronic tap signal through the low pass filter 242 and into the multiplying function 250. The multiplier 250 multiplies the low-pass filtered electronic tap signal corresponding to the optical output with a low-passed filtered electronic signal tapped from the NRZ data signal. More specifically, it multiplies the low-pass filtered electronic tap signal corresponding to the optical output with a portion of the input reference signal that has been passed through a coarse time delay element and the low pass filter 244. The coarse time delay element is provided to align the recovered tap signal from the optical modulator and the input reference signals when they are multiplied. To the extent that this alignment is achieved, a better quality of modulation signal will be created, although the lowest frequency content of the tap and reference signals will still create signal energy in the quality of modulation signal for modest time alignment.

Once the tap and reference signals are multiplied by the multiplier 250, and passed through the low pass filter 246, the magnitude of the product, which is at a maximum when the system parameters are optimized, is used (e.g., analyzed) to determine changes in the system parameters. More specifically, the low-pass filtered product is passed to the hill climber 260, which uses a sample and hold, and differencing algorithm (i.e., known as a hill climber algorithm), to compare previous operating parameters to present operating parameters. By way of the quality of modulation signal, the hill climber algorithm can move towards the maximum by changing the operating parameters (e.g., bias voltage) of the system. In this embodiment, the change in operating parameters is introduced via a single electrical input to the optical modulator, which provides both the electrical input information signal and the voltage biasing signal used to hold the optical modulator at a predetermined bias (operating) point.

Various waveforms to further describe the above-mentioned set-up have been simulated and are described below.

Figure 13A:
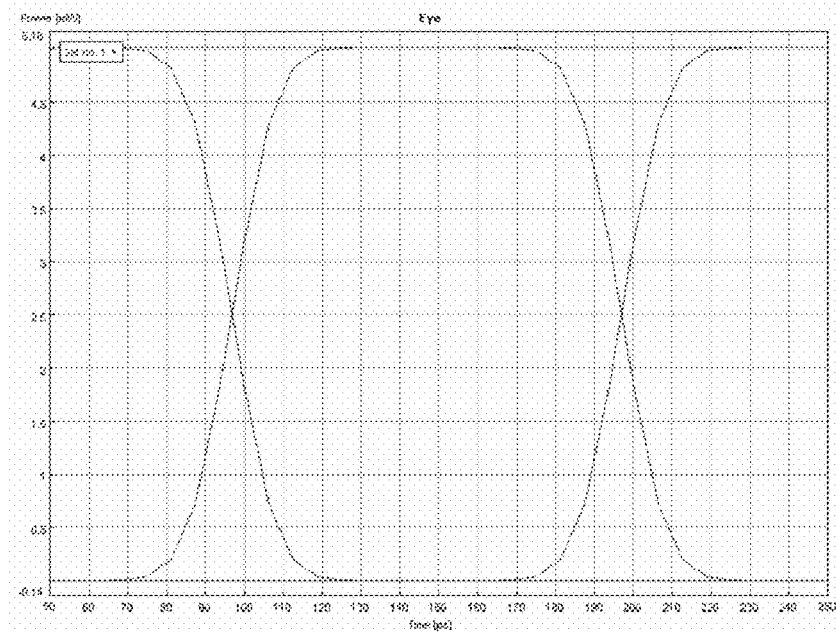
FIG. 13a is an eye diagram from a correctly biased optical modulator.
Figure 13B:
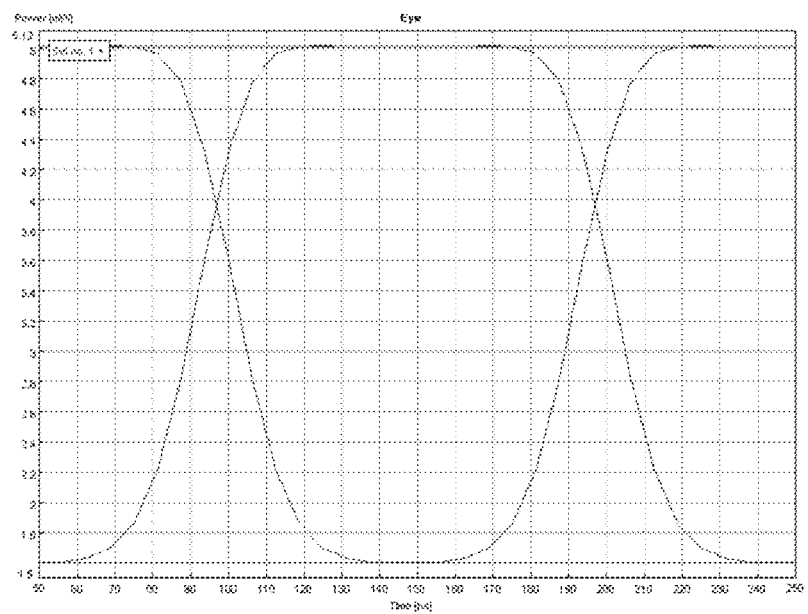
FIG. 13b is an eye diagram from an optical modulator wherein the bias is set too high.
Figure 13C:
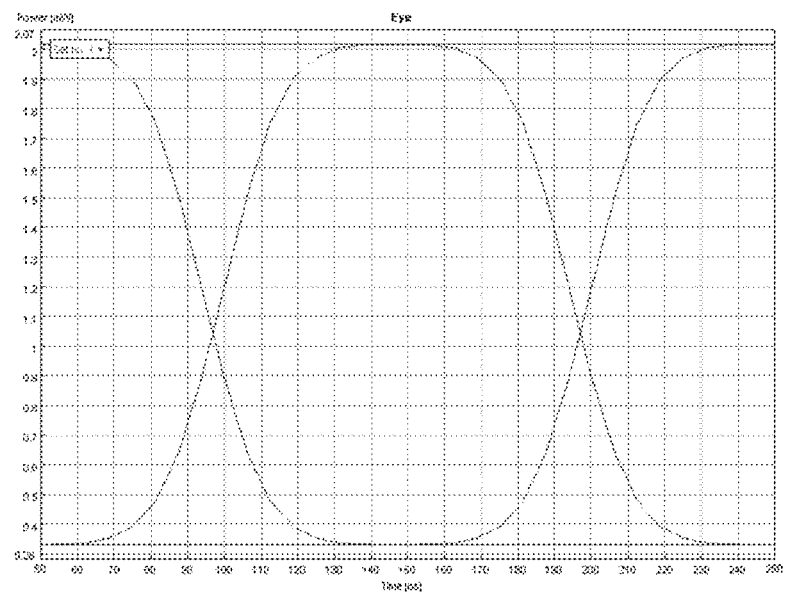
FIG. 13c is an eye diagram from an optical modulator wherein the bias is set too low.

FIGS. 13a, 13b, and 13c are typical "eye" diagrams showing the loci of the 1 and 0 patterns of the NRZ signal output from the optical modulator. More specifically, FIG. 13a is a nominal eye diagram with correct biasing, FIG. 13b is a nominally driven eye diagram with the bias set high, and FIG. 13c is a nominally driven eye diagram with the bias set low. The intersecting points of the rising and falling edges are affected directly by the bias points of the modulator as are the topline and bottomline fidelity, with overshoot and spreading of the top and bottom lines depending on whether the biasing of the modulator is higher or lower than the correct value.

Figure 14:
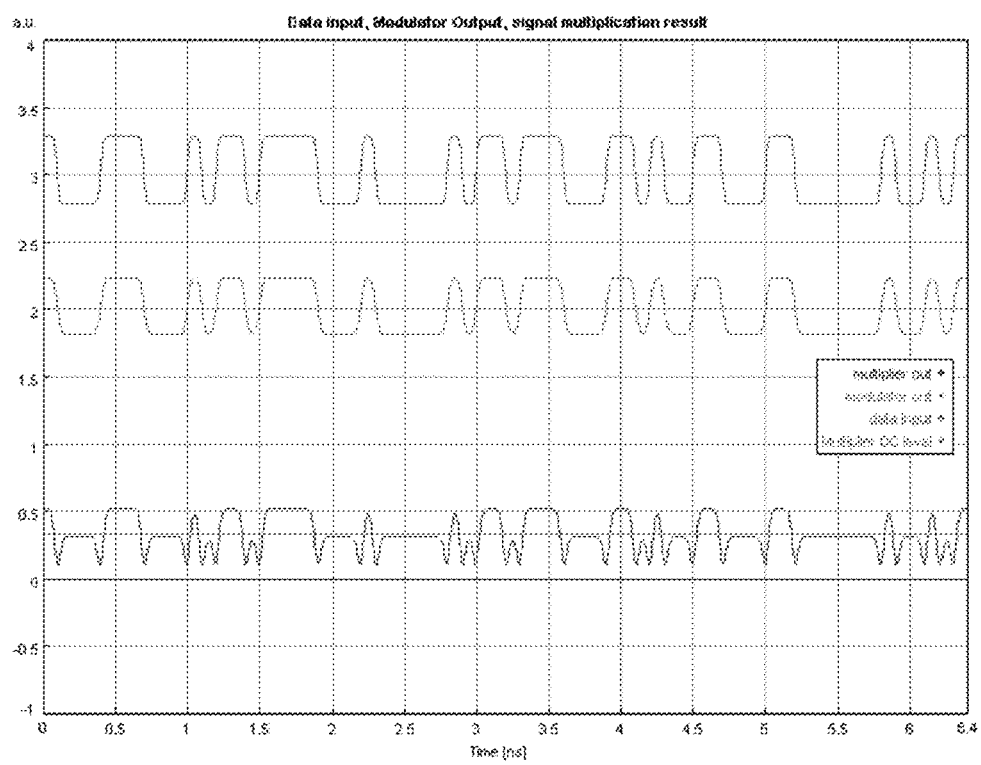
FIG. 14 illustrates the input waveforms and output waveforms of the multiplier in FIG. 12 when the bias is set at quadrature.

FIG. 14 shows the waveforms input and output from the multiplier 250, when the modulator 220 is biased correctly (i.e., at quadrature). The top plot corresponds to the input reference signal, the middle plot corresponds to the electronic tap signal from the modulator, and the bottom plot corresponds to the multiplier output. The horizontal value line near the bottom of the graph shows a multiplier DC level that is the maximum value for all possible combinations of modulator biasing. This value is approximately 0.3 a.u. on the y axis relative scale used in the simulation. Note that since the input reference signal and modulator output waveforms (top plots) follow each other with good fidelity, the product (bottom plot) includes squared magnitudes with the maximum average value.

Figure 15:
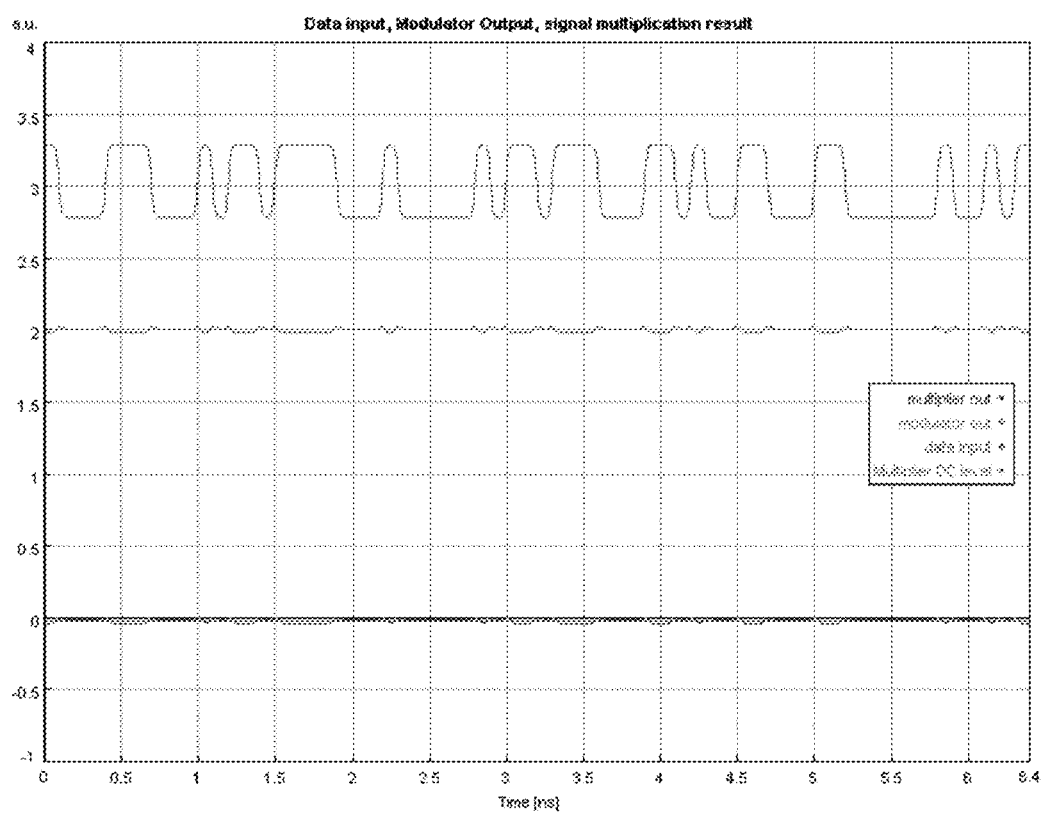
FIG. 15 illustrates the input waveforms and output waveforms of the multiplier in FIG. 12 when the bias is at null.

FIG. 15 shows the waveforms input and output from the multiplier 250, when the modulator 220 is biased at null (i.e., at the bottom of the transfer function). The top plot corresponds to the input reference signal, the middle plot corresponds to the electronic tap signal from the modulator, and the bottom plot corresponds to the multiplier output. The horizontal value line near the bottom of the graph shows the multiplier DC level. In this instance, the modulator output (middle plot) is very small, folded over, and does not match the input data very well. As a result, the multiplication occurs with very poor correlation, and the multiplier output (bottom plot) is very small.

Figure 16:
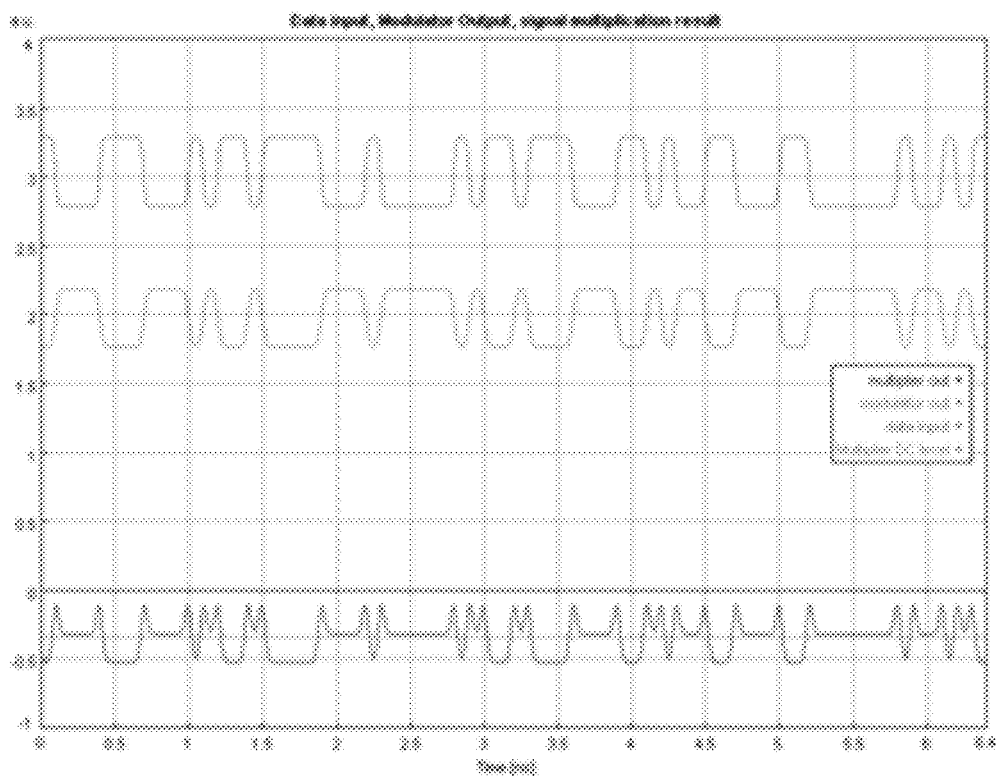
FIG. 16 illustrates the input waveforms and output waveforms of the multiplier in FIG. 12 when the bias is set near quadrature with negative polarity.

FIG. 16 shows the waveform input and output from the multiplier 250, when the modulator 220 is biased with a bias point causing the modulator output to flip polarity (e.g., at or near quadrature, but with negative polarity). The top plot corresponds to the input reference signal, the middle plot corresponds to the electronic tap signal from the modulator, and the lowest plot corresponds to the multiplier output. The horizontal value line near the bottom of the graph shows the multiplier DC level. In this instance, since the polarity of the modulator output has reversed polarity, the product will have a negative value.

Accordingly, it is clear that analog multiplication of the data reference input and modulator tap output provides a quality of modulation signal that can be used to track the operating conditions of the optical modulator. For example, the magnitude of the quality of modulation signal will be maximized when the modulator is correctly biased. Notably, the magnitude of the quality of modulation signal could be maximized in the negative direction by choice, which would result in an optimized eye with flipped polarity. In either case, the polarity information is preserved in the proper context to permit control loop operation where the positive or negative polarity is optimized in the output from the modulator.

In general, the operating conditions of the optical modulator will be tracked using the near DC or average value of the quality of modulation signal (e.g., termed the output discriminant). Various simulations have been performed, which show the output discriminant as a function of varying drive levels and bias points, and are described below.

Figure 17:
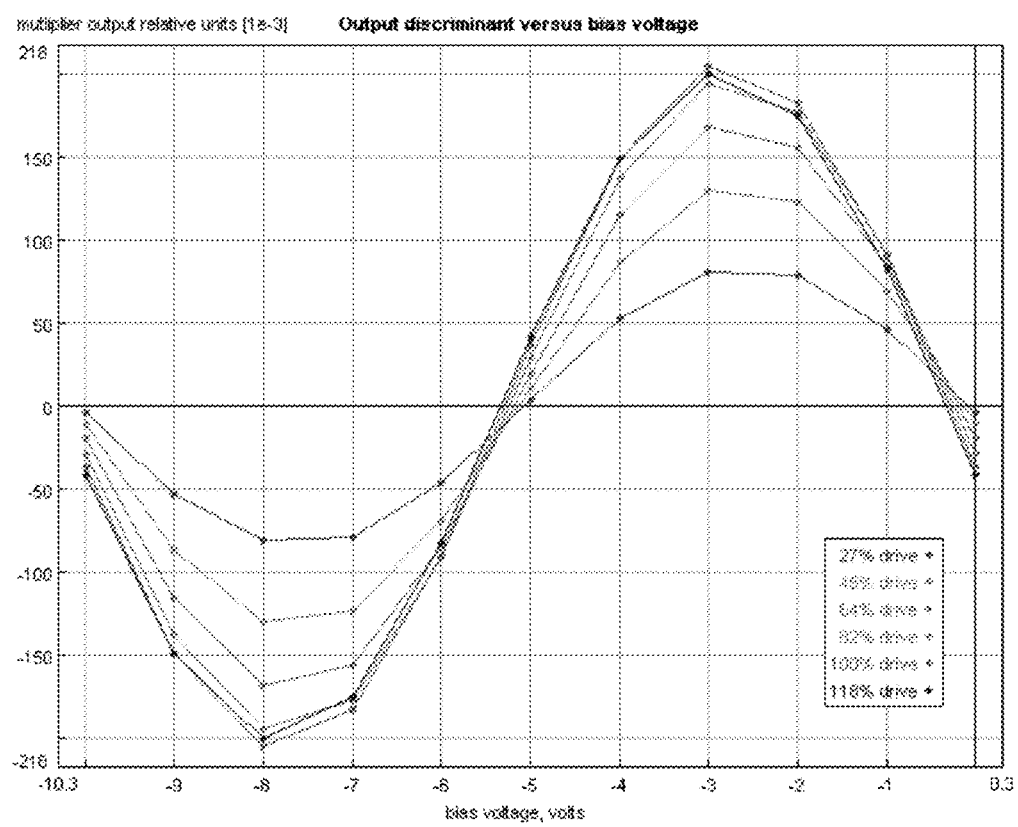
FIG. 17 shows a simulated plot of output discriminant as a function of bias voltage.

FIG. 17 shows the output discriminant as a function of bias point, for various drive levels. In general, the average value of the quality of modulation signal increases in magnitude as the driver drive level increase. Note, however, that even though the driver drive level was varied from 27% up through 118%, there was no change in the polarity of the discriminant, or in the locations of the maximum magnitude. Accordingly, for any drive level, the multiplier output will provide the system with the correct information in seeking the proper bias point.

Figure 18:
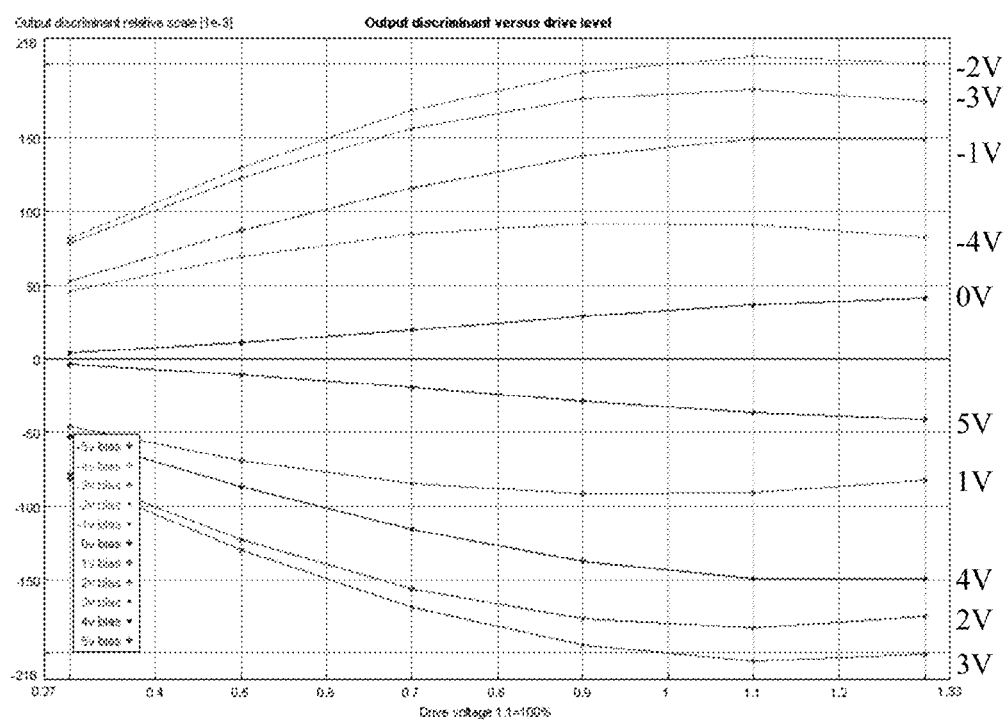
FIG. 18 shows a simulated plot of output discriminant as a function of drive level.
Figure 19:
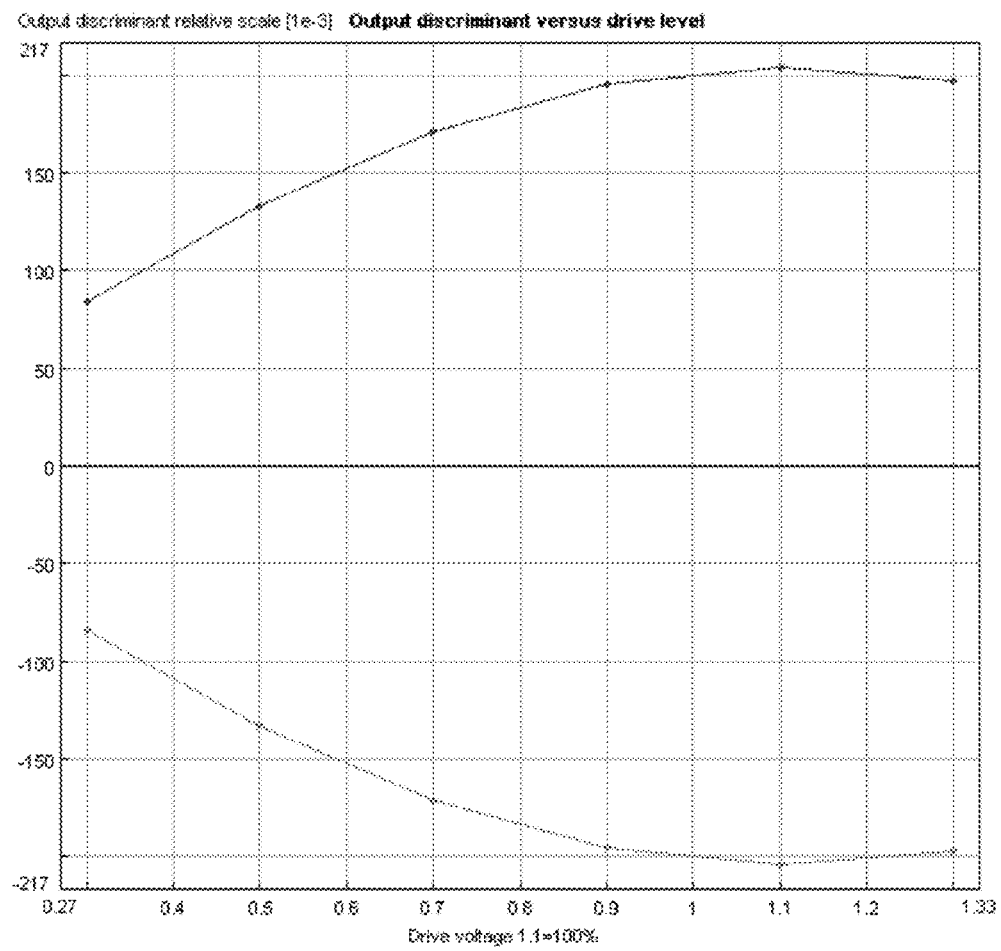
FIG. 19 shows the simulated plot of output discriminant as a function of drive level for two different bias voltages, each of which corresponds to proper eye biasing, but are opposite in phase.

FIG. 18 shows the output discriminant as a function of drive level, for various bias points. Notably, the transfer function is double valued at the symmetrical operating bias points of the modulator, and that the maximum magnitudes do change slightly with different selected bias points. The slight change influence from bias point is a concern, however if the bias point is being locked up by a suitable control loop, then the convergence of the drive level should be achievable. The double valued nature is shown in FIG. 19, with only 2 symmetric polarity points (e.g., one with proper eye biasing and one with the opposite phase proper eye biasing). The implication of this is that the drive level might have the wrong loop sign depending on the biasing of the modulator. To this extent, the strategy for bias and drive control is to make the drive level loop subordinate to the bias control loop. Since the drive level will converge for a range of values otherwise, the driver could be constrained to a rough setting of +/−50%, and the bias control loop will converge properly. The driver loop might initially converge or not converge, but will converge as the modulator bias point is reached in the positive or negative quadrant of values. This initial ambiguity is not seen as problematic, because it will converge without any intervention once the bias point of the modulator is reached.

Experimental results have also shown that the optical set-up illustrated in FIG. 12 works well. For example, when a low frequency analog multiplier (i.e., Analog Devices, AD633JN, having a bandwidth of about 1 MHz)), a 10 Gb/s $LiNbO_3$ modulator, electrical driver, laser, and low frequency monitoring photodiode were evaluated with 10.7 Gb/s NRZ data, the discriminant was in the range of −6 to +6 mV. More specifically, when the oscilloscope showed a digital eye with proper bias, the output value was 5.7 mV, whereas when the oscilloscope showed a folded down, improperly biased eye, the multiplier had an output of 0.7 mV. The output signal from the multiplication process did reach a maximum when the eye bias was optimized, and also a maximum magnitude, negative sign, when the bias point of the $LiNbO_3$ modulator was optimized at the opposite ½ fringe point away.

Figure 20:
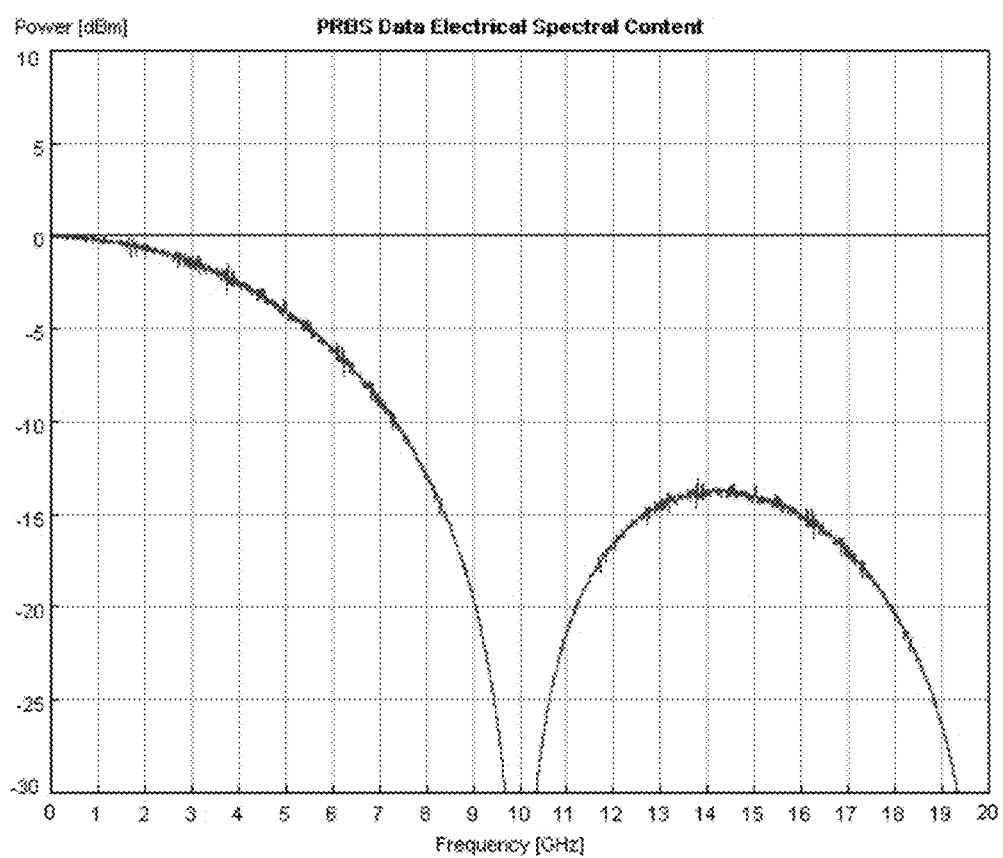
FIG. 20 illustrates the broad frequency content of a NRZ data power spectrum.
Figure 21:
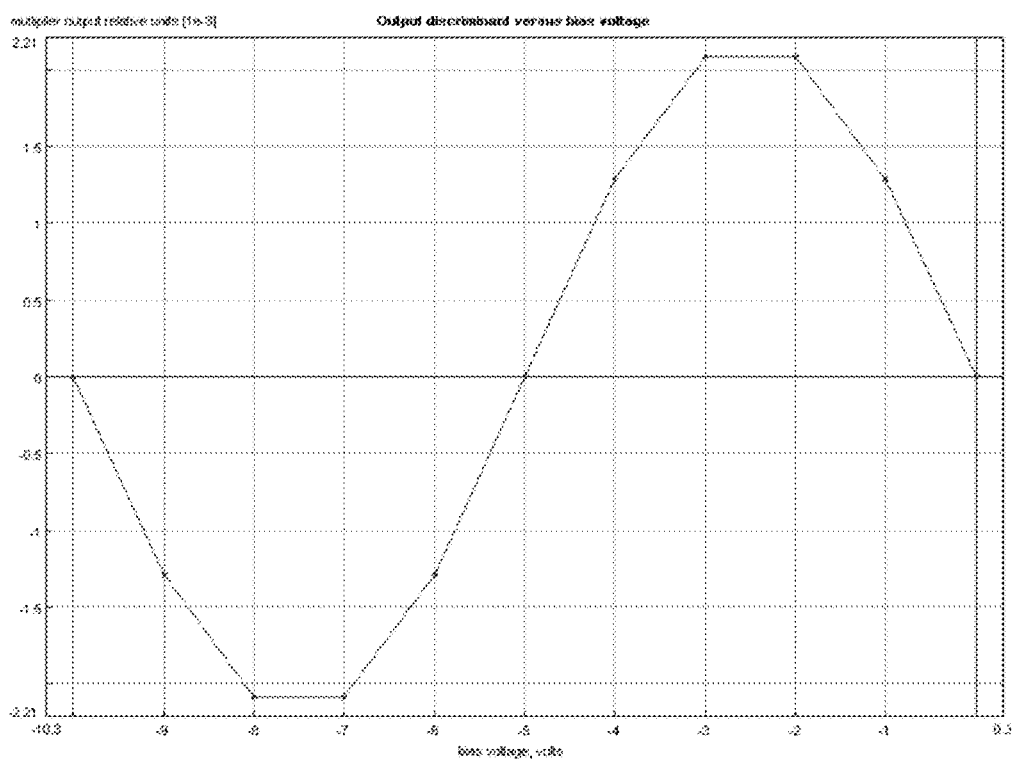
FIG. 21 shows a simulated plot of output discriminant as a function of bias voltage for 100 MHz band limited signals.

Advantageously, this success was achieved using low frequency signals. It is well known that PRBS data streams and typical digital NRZ data streams have broad frequency content. Referring to FIG. 20, this broad spectrum data, which has a near sine(x)/x, or "sinc" functional character, includes signal content down to low frequency. In the experimental set-up described above, the 10 Gbs NRZ input waveforms input to the multiplier were band limited to 100 MHz (e.g., by the low-pass filter 242) before being multiplied and passed through the second low-pass filter 246. The resulting discriminant function, for the properly biased optical modulator 220, is shown in FIG. 21. Although the lower signal energy corresponding to the low-passed filtered signal results in a discriminant with a smaller magnitude, the measurable signal does resemble the curves depicted in FIG. 16. Notably, since the control loop works with low frequency signals, lower cost and lower power consumption devices can be used. Optionally, the lower band region could be sampled, and the lower cost and power consumption devices could be designed with higher gain to recover the lost scaling.

Figure 22:
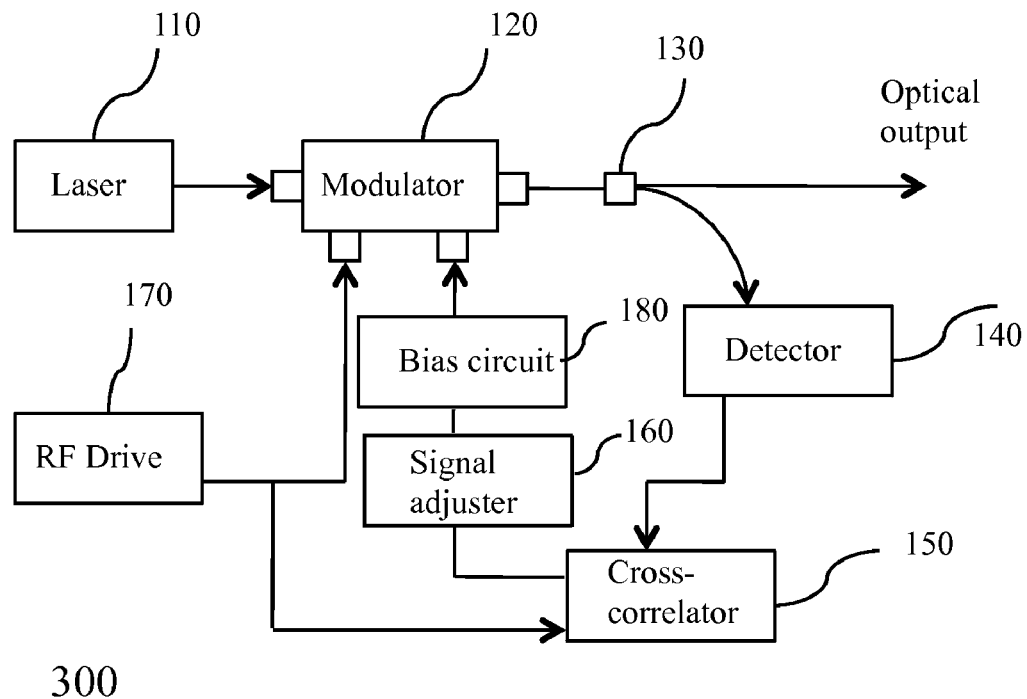
FIG. 22 is a block diagram of another optical transmitter, wherein a MZ optical modulator is controlled without dither in accordance with an embodiment of the instant invention.

In the embodiment discussed with reference to FIG. 12, the quality of modulation signal is used generally to control the optical modulator by changing the DC bias voltage to be applied, which is summed with the RF drive signal such that the two signals are applied via a single electrical connection. In other embodiments of the instant invention, the DC bias voltage and RF drive voltage are applied via different electrical input ports. For example, see the optical transmitter 300 illustrated in FIG. 22.

Figure 23:
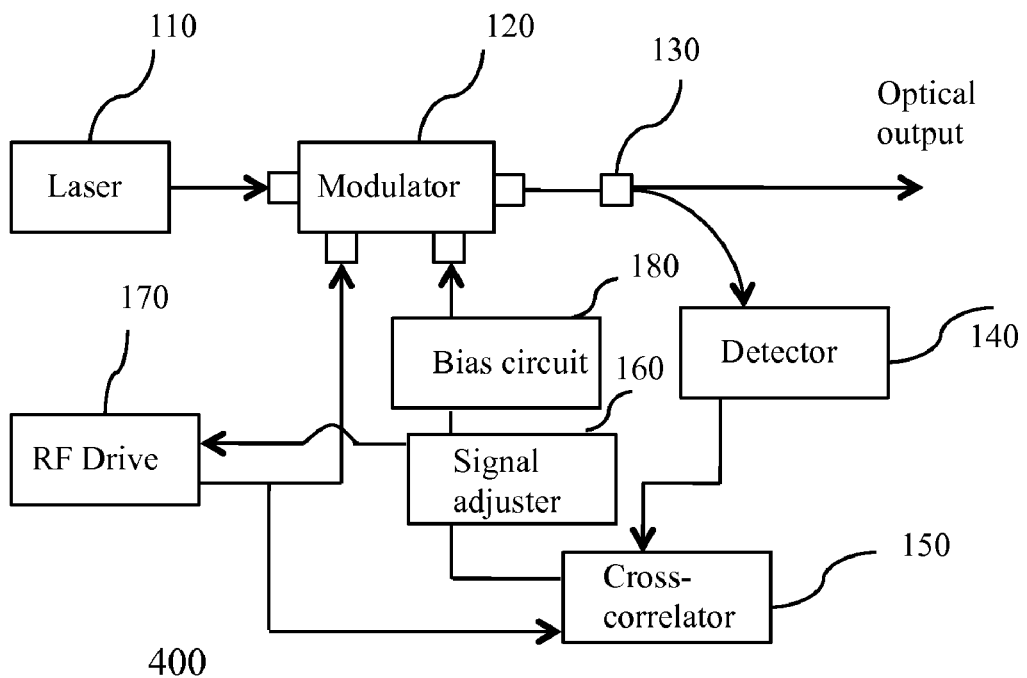
FIG. 23 is a block diagram of another optical transmitter, wherein a MZ optical modulator is controlled without dither in accordance with an embodiment of the instant invention.

In addition, in the embodiment discussed with reference to FIG. 12, the quality of modulation signal is used generally to control the bias point of the optical modulator. However, while this ditherless control scheme is useful for maintaining an optical modulator at a predetermined bias point (e.g., quadrature or some other point for cascaded optical modulators), it is also envisioned to be useful for controlling other operating parameters, such as the RF drive level, and/or the time skew or differential time delay in dual drive optical modulators. For example, see the optical transmitter 400 illustrated in FIG. 23, wherein the signal adjuster also provides feedback to control the RF driver amplitude.

Notably, this ditherless control scheme is envisioned as being useful for eliminating distortions, harmonics, or other aberrations in the modulator output signal and/or controlling chirp. According to another embodiment of the instant invention, optimization of the cross-correlation (or multiplication), is used to adjust the best timing alignment between the reference data path, and the modulator output monitored signal. This allows, not only transmitter optimization, but also flexible self alignment of the control loops and monitoring paths by using the same quality of modulation signal.

In the embodiment discussed with reference to FIG. 12, the ditherless control scheme has been shown to be beneficial for controlling the digital transmission of NRZ optical signals, however, it is envisioned for use with any analog or digital information signal. For example, it is envisioned that it would also work with arbitrary non-digital signals, CATV analog transmission, antenna remoting, or other digital formats such as RZ (e.g., although the bandwidths of the sensing would have to be appropriately matched to the signal spectrum of the input signals).

In addition, in the embodiment discussed with reference to FIG. 12, the multiplier 250 and signal adjuster 260 utilized analog components. In other embodiments, the electronic tap signal provided by the photodetector 140 is converted to a digital logic signal and the cross-correlator 150, signal adjuster 160, and one or more low-pass filters are replaced with the corresponding digital elements that perform the low-passing, amplification, multiplying, integrating, sampling, etc. For example, in one embodiment, the cross-correlating/multiplying and signal adjusting is performed in software.

In each of above described embodiments, the cross-correlator/multiplier uses the information-bearing signal sampled from the input data stream, which it correlates with the output optical data stream, to get an indication of the quality of modulation provided by the optical modulator and to provide feedback for controlling the optical modulator in order to improve the optical output signal. Advantageously, this control is provided without impressing a dither or pilot tone on the actual system signal output from the transmitter. Moreover, there is no amplitude modulation or other corruption of the input waveform. Accordingly, this method of controlling modulation of an optical signal is less disruptive and simpler than those using AM dither. In addition, in each of the above-described embodiments the monitored portion of the modulated optical signal is multiplied or cross-correlated with the drive signal in order to provide the quality of modulation signal. Accordingly, this method of controlling modulation of an optical signal is superior to methods that only monitor the average optical signal power, and thus are susceptible to errors when the average power is affected by other undesired effects.

Figure 24:
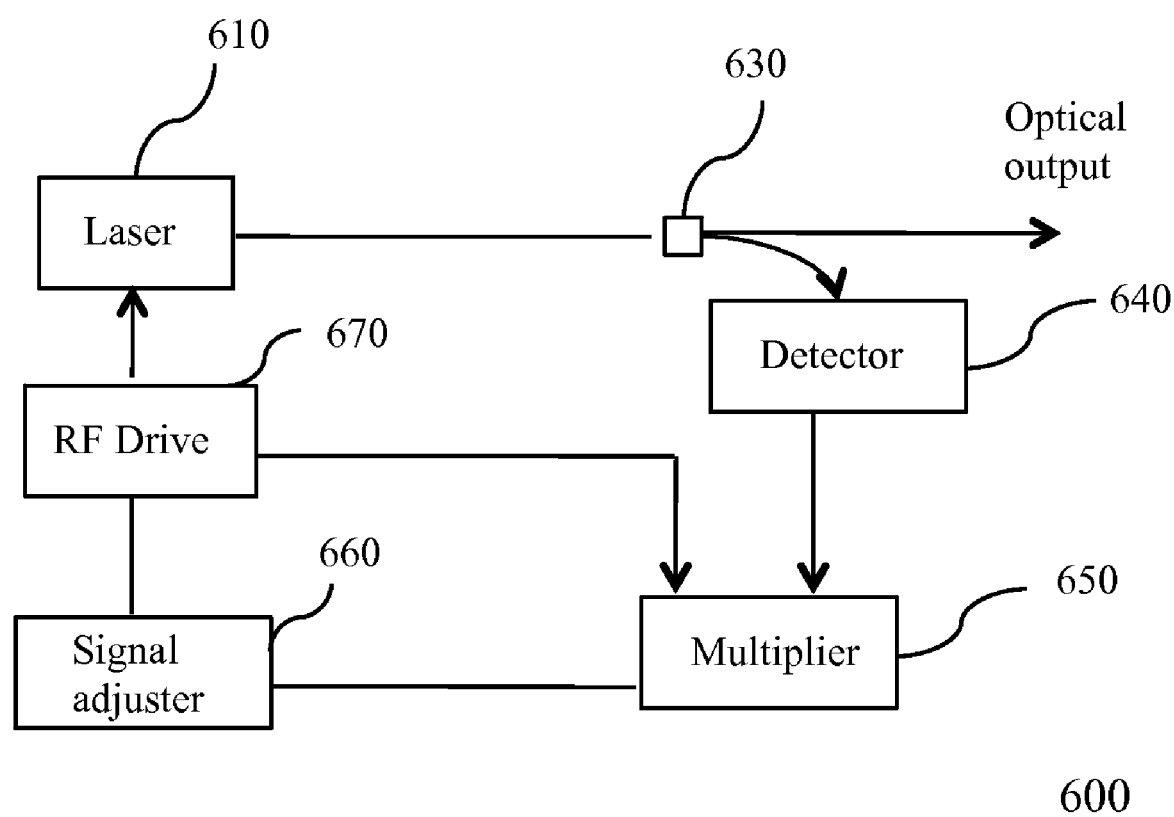
FIG. 24 is a block diagram of another optical transmitter using direct modulation, wherein the bias and/or RF drive is controlled without dither in accordance with an embodiment of the instant invention.

Referring to FIG. 24, there is shown a block diagram of an optical transmitter utilizing ditherless control of a laser in accordance with one embodiment of the instant invention. In this embodiment, the digital NRZ optical signal is provided by direct modulation (e.g., as opposed to using an external modulator). The optical transmitter 600 includes a light source 610, a tap or optical coupler 630, a photodetector 640, a cross-correlator depicted as a multiplier 650, a signal adjuster 660, and an RF drive signal source 670. Optionally, a coarse delay adjustment or other means for matching signals to be multiplied by the multiplier is provided (i.e., to improve the time alignment of the signals). Further optionally, one or more low-pass filters (not shown) are provided to filter the signals upstream and/or downstream from the multiplier 650.

In this embodiment, the light source 610 is typically a CW laser such as a semiconductor laser. The photodetector 640 is typically a photodiode, which converts a tapped portion of the optical signal output from the laser 610 to an electrical signal. Alternatively, the photodetector 640 is a photodiode for monitoring the off state light (i.e., substrate light). The cross-correlator 650 is typically an analog multiplier (e.g., circuit) or other device that provides cross-correlation, which cross-correlates/multiplies the modulated optical output (i.e., in the form of the electrical signal provided by the photodiode) with the RF drive signal to provide a quality of modulation signal. This quality of modulation signal provides an indication of the fidelity of the output optical signal. The signal adjuster 660 is typically one or more analog electronic components/circuits, such as a hill climber, that compares previous operating parameters to present operating parameters using the quality of modulation signal, and provides feedback to optimize/change the operating parameters (e.g., bias point). The use of a coarse delay adjustment or other means for improving time alignment of the signals to be multiplied improves the quality of modulation signal. The use of one or more low-pass filters (not shown) means that only the low frequency regions of the signal band needs to be monitored with the photodetector 640 and that the product provided by the multiplier 650 will be low frequency in nature. In fact, one advantage of this approach is that active control can be achieved with low frequency signals only, thus providing significant reductions in power and component cost.

In each of the above described embodiments, the modulated optical output is tapped/sampled and cross-correlated with a tapped/sampled portion of the data modulation signal to produce a quality of modulation signal. The quality of modulation signal is used to optimize one or more parameters (e.g., bias point, RF drive level, chirp, timing alignment) of the optical transmitter. If more than one parameter is controlled, they may be altered simultaneously or in tandem. Notably, the quality of modulation signal provides an indication as to the quality of the output optical signal (e.g., which may take into account the eye opening, eye crossing, chirp, pre-emphasis, reproduction of electrical input signal, elimination of electrical or optical distortions encountered in the modulation process, and analog modulation parameters such as CSO, CTB, spurs, IMD, etc).

Of course, the embodiments of the invention described above have been presented by way of example only. It will be understood by those skilled in the art that various omissions and substitutions may be made without departing from the spirit and scope of the invention as defined by the appended claims.

The invention claimed is:

1. A method of providing a modulated optical signal comprising:
   generating an electrical data modulation signal, the electrical data modulation signal for providing a drive signal and a reference signal;
   modulating an optical signal using the drive signal;
   converting a portion of the modulated optical signal into an electrical signal;
   cross-correlating the electrical signal with the reference signal to provide a quality of modulation signal; and
   adjusting system operating parameters in dependence upon the quality of modulation signal.

2. A method according to claim 1, wherein modulating the optical signal comprises passing a continuous wave light signal through an external optical modulator and applying the drive signal to an electrode on the external optical modulator to impress the electrical data modulation signal on the optical signal and provide the modulated optical signal.

3. A method according to claim 1, comprising passing the electrical signal through a first low-pass filter and the reference signal through a second low-pass filter, prior to the step of cross-correlating the electrical signal with the reference signal.

4. A method according to claim 3, comprising passing the quality of modulation signal through a third low-pass filter.

5. A method according to claim 1, comprising passing the quality of modulation signal through a low-pass filter.

6. A method according to claim 1, wherein adjusting system operating parameters includes adjusting the bias point to improve the cross-correlation.

7. A method according to claim 1, wherein adjusting system operating parameters includes adjusting the bias point to increase an average magnitude of the quality of modulation signal.

8. A system for providing a modulated optical signal comprising:
a modulation signal source for generating an electrical data modulation signal, the electrical data modulation signal for providing a drive signal and a reference signal;
an optical modulator for producing a modulated optical signal using the drive signal;
a photodetector for converting a portion of the modulated optical signal into an electrical signal;
a cross-correlator having a first input for receiving the electrical signal, a second input for receiving the reference signal, and an output for providing a quality of modulation signal, the quality of modulation signal equal to the product of the electrical signal and the reference signal; and
a signal adjuster for adjusting operating parameters of the optical modulator in dependence upon the quality of modulation signal.

9. A system according to claim 8, wherein the signal adjuster includes a control loop for comparing past operating parameters of the optical modulator to present operating parameters of the optical modulator using an average magnitude of the quality of modulation signal, and for adjusting the operating parameters to increase the magnitude of the quality of modulation signal.

10. A system according to claim 9, wherein the operating parameters include a bias point of the optical modulator.

11. A system according to claim 9, wherein the operating parameters include an RF drive level of the optical modulator.

12. A system according to claim 9, wherein the cross-correlator is an analog multiplier.

13. A system according to claim 9, wherein the optical modulator is an external optical modulator including an input optical port for receiving a continuous wave light signal and an output optical port for transmitting the modulated optical signal.

14. A system according to claim 13, wherein the optical modulator includes at least one electrical input for applying the drive signal and modulating the continuous wave light signal to provide the modulated optical signal.

15. A system according to claim 13, wherein the optical modulator comprises a Mach-Zehnder interferometer formed in an electro-optic substrate, and wherein the at least one electrical input is for applying the drive signal to electrodes disposed on the interferometer.

16. A system according to claim 13, comprising a semiconductor laser for providing the continuous wave light signal.

17. A system according to claim 9, wherein the optical modulator comprises a drive circuit for directly modulating a laser.

18. A system according to claim 9, comprising a first low-pass filter disposed between the photodetector and the first input of the cross-correlator and a second low-pass filter disposed between the modulation signal source and the second input of the cross-correlator.

19. A system according to claim 18, comprising a third low-pass filter for filtering the quality of modulation signal.

20. A system according to claim 9, comprising a low-pass filter for filtering the quality of modulation signal.

21. A system according to claim 9, comprising a course delay adjustment for improving alignment of the electrical signal and the reference signal.

22. A system according to claim 9, wherein the signal adjuster comprises a hill climber.

23. A system for providing a modulated optical signal comprising:
an optical modulator having an input optical port for receiving a light signal, an input electrical port for receiving a data modulation electrical signal for modulating the light signal, and an output port for transmitting a modulated light signal;
a reference modulation signal source for generating the data modulation electrical signal and a reference data modulation signal;
a tap for separating a portion of the modulated light signal;
a monitoring photodiode detector for monitoring the portion of the modulated light signal exiting the optical modulator, and for generating a modulated electrical output tap signal;
a signal processor for receiving the reference data modulation signal and the modulated electrical output tap signal, for forming a cross-correlation of the reference data modulation signal and the modulated electrical output tap signal, and for creating a quality of modulation performance signal; and
a signal adjuster for adjusting the data modulation electrical signal based on the quality of modulation performance signal in order to improve the modulated optical output signal.

\* \* \* \* \*